UNITED STATES PATENT OFFICE.

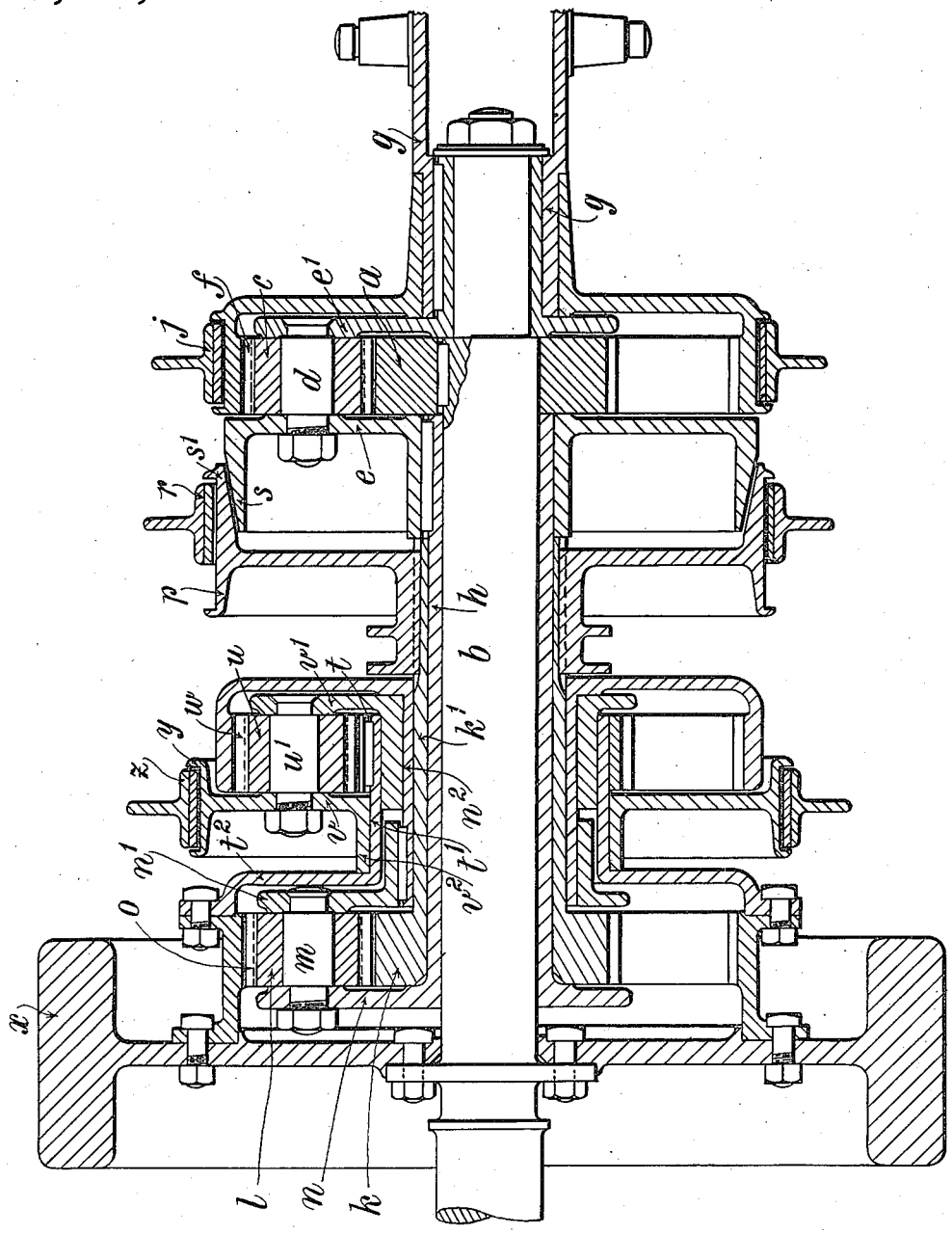

FREDERICK HENRY ROYCE, OF DERBY, ENGLAND.

CHANGE-SPEED AND REVERSING GEARING.

1,132,390. Specification of Letters Patent. Patented Mar. 16, 1915.

Application filed November 25, 1913. Serial No. 802,938.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in Change-Speed and Reversing Gearing, of which the following is a specification.

This invention relates to gearing—of the epicyclic type in which three trains are employed and combined for obtaining three forward speeds (including a direct drive) and a reverse speed, and it consists of the arrangement hereinafter more particularly specified and shown in the accompanying drawing (which is diagrammatic only and in which the figure is a view in sectional elevation), the object being to overcome the many difficulties which are experienced in disposing the elements of the trains in a manner which renders them accessible without unduly complicating the driving connections, clutches, and sleeves, or compounding two of the trains for the purpose of obtaining a suitable speed ratio of one of the trains.

The sun wheel $a$ of the first epicyclic train is mounted in driving connection with the motor shaft $b$; the planet pinions $c$—of which there may be any suitable number—are mounted on pins $d$ carried by and between two planet disks $e$ and $e^1$; and the internally toothed annulus $f$ is revolubly mounted on the member to be driven $g$. The planet disk $e^1$ is revolubly mounted upon the shaft $b$ but in driving connection with the final driven member $g$, and the planet disk $e$ is in driving connection with a sleeve $h$ revolubly mounted on the shaft $b$. The annulus $f$ is capable of being held stationary by the application of a band brake $j$ or by other suitable means. This train gives the first or lowest forward speed, to obtain which the annulus $f$ is held stationary by the brake $j$ so that when the sun wheel $a$ is driven by the prime mover acting directly through the shaft $b$, the planet pinions $c$, together with the disks $e$ and $e^1$—one of which transmits the drive to the vehicle through the member $g$—are caused to rotate in the same direction as the sun wheel $a$ at a slower speed. The reduction thus obtained can be conveniently arranged to give a ratio of about 3 to 1, which is suitable for the first or lowest gear. The sun wheel $k$ of the second train of gearing is carried by a sleeve $k^1$ which is revolubly mounted on the sleeve $h$ and is in driving connection with a brake drum $p$; the planet pinions $l$—of which there are any suitable number—are mounted on pins $m$ carried by and between the planet disks $n$ and $n^1$; and the internally toothed annulus $o$ is connected to and driven by the prime mover, preferably by attaching it by means of a flange to the fly wheel $x$ as shown. The planet disk $n$ is mounted on or forms part of the sleeve $h$ and the planet disk $n^1$ is mounted in driving connection with a sleeve $n^2$ which is revolubly mounted on the sleeve $k^1$. The sleeve $k^1$ is capable of being held stationary by the application of a band brake $r$ or its equivalent on a brake drum $p$ mounted on said sleeve $k^1$. To obtain the second or intermediate forward speed the sun wheel $k$ is held stationary by suitable means such as a brake $r$ acting on the drum $p$, which, when motion is imparted to the annulus $o$, causes the pinions $l$ together with the pinion disks $n$ and $n^1$, to be driven at a slow speed in the same direction as the annulus, the drive being transmitted from the disk $n$ to the final driven member $g$ by means of the sleeve $h$, the disk $e$ and $e^1$, and the pins $d$. The reduction thus obtained can conveniently be arranged to give a gear ratio of about 3 to 2. The third or top forward speed is obtained by coupling the sun wheel of the second train either directly or indirectly to the planet disks of the second train. In the construction illustrated the pinion disk $e$ of the first train of gearing has fixed to or formed in one with its outside diameter one portion $s$ of a cone or other suitable clutch, the other portion $s^1$ of the said clutch being fixed to or formed in one with the brake drum $p$ which is carried by the sleeve $k^1$ of the sun wheel $k$ and which is provided with means for sliding it in and out of engagement with the portion $s$ of the clutch. By engaging the two parts of the clutch a driving connection is made between the sun wheel of the second train and the planet disks of the primary train, thus causing the two trains to revolve *en bloc*, and so produce a direct drive from the prime mover to the final driven member. This method of obtaining the top speed has the advantage that the clutch effort between the driving and driven portions is less than the total driving torque transmitted from the prime mover; the torque to be transmitted from the driving to the driven member of the clutch being dependent upon the ratio of the second speed adopted; for example, if the second speed ratio is 2 to 3 the clutch effort required will be only 50% of the total torque to be transmitted.

For the purpose of obtaining a reverse drive a third epicyclic train is used in which the sun wheel $t$ is in driving connection with a sleeve $t^1$ which is connected by means of the flange $t^2$ with the annulus $o$ and therefore with the prime mover through the fly wheel $x$, the planet pinions $u$—of which there are any suitable number—are mounted on the pins $u^1$ carried by the planet disks $v$ and $v^1$, and the internally toothed annulus $w$ is in driving connection with the planet disks $n$ and $n^1$ of the second train of gearing through the sleeve $n^2$. The planet disk $v$ is carried by a sleeve $v^2$ revolubly mounted on sleeve $t^1$ and carries a brake drum $y$ which is capable of being held stationary by means of a brake $z$ or by other suitable means. The annulus $w$ is mounted on or forms part of the sleeve $n^2$ which is in driving connection with the planet disks $n$ and $n^1$. Thus it will be seen that if the planet disk $v$ is held stationary by means of the brake $z$ while the sun wheel is being driven by the prime mover—acting through the annulus $o$, the flange $t^2$, and the sleeve $t^1$—the annulus $w$ will be driven at a slower speed than and in the opposite direction to the sun wheel $t$ the drive being transmitted to the member $g$ through the disks $n$ and $n^1$ and the pins $m$ and the disks $e$ and $e^1$ and the pins $d$.

I prefer to operate the various brakes for the epicyclic elements by means of a hydraulic system, using oil, but the same brakes may alternatively be operated by any suitable means such as a convenient manually or spring-operated or other system of levers, but the form of said brakes and their operating mechanism and also the form of clutch form no part of this invention.

What I claim as my invention and desire to secure by Letters Patent is:—

1. In change speed gearing of the epicyclic type, the combination with a driving and a driven member, of a primary train comprising a sun wheel in driving connection with the driving member, disks in driving connection with the driven member, planet wheels carried by said disks, an internally toothed annulus revolubly mounted on the driven member, and means for holding said annulus stationary, of a second train comprising an internally toothed annulus in driving connection with the driving member, disks in driving connection with the disks of the primary train, planet wheels carried by said disks, a sun wheel revolubly mounted in relation to the driving member, and means for holding said sun wheel against rotation, of a third train comprising a sun wheel mounted in driving connection with the annulus of the second train, disks revolubly mounted in relation to the driving member, planet pinions carried by said disks, means for holding said disks against rotation, and an internally toothed annulus in driving connection with the disks of the primary train, and of a clutch for coupling together the sun wheel and the disks of the secondary train.

2. In change speed gearing of the epicyclic type the combination with a driving and a driven member, of a primary train comprising a sun wheel in driving connection with the driving member, disks in driving connection with the driven member, planet wheels carried thereby, an internally toothed annulus revolubly mounted on the driven member, and means for holding said annulus stationary, of a second train comprising an internally toothed annulus in driving connection with the driving member, disks in driving connection with the disks of the primary train, planet wheels carried thereby, a sun wheel revolubly mounted in relation to the driving member, a clutch for coupling said sun wheel to the disks, and means for holding said sun wheel against rotation, and of a third train comprising a sun wheel mounted in driving connection with the annulus of the second train, disks revolubly mounted in relation to the driving member, planet pinions carried thereby, means for holding said disks against rotation, and an internally toothed annulus in driving connection with the disks of the primary train through the disks of the secondary train.

3. In change speed gearing of the epicyclic type, the combination with the driving and driven members, of an epicyclic train comprising a sun wheel mounted on and in driving connection with the driving member, disks in driving connection with the member to be driven, planet pinions carried thereby, an internally toothed annulus revolubly mounted in relation to the driven member, and means for holding said annulus against rotation, of a second epicyclic train comprising an internally toothed annulus in driving connection with the driving member, disks in driving connection with the disks of the primary train, planet pinions carried thereby, a sun wheel revolubly mounted in relation to the driving member, and means for holding said sun wheel against rotation, of a third epicyclic train mounted between the two aforesaid trains and comprising a sun wheel mounted in driving connection with the annulus of the second train, disks revolubly mounted in relation to the driving member, planet pinions carried thereby, and means for holding said disks against rotation, and of a clutch located between the first and second epicyclic trains and adapted to couple the sun wheel of the secondary epicyclic train with the disks of the same train.

4. In change speed gearing of the epicyclic type the combination with a driving shaft and a driven shaft, of a primary train comprising a sun wheel mounted on and in driving connection with the driving shaft, disks revolubly mounted on the driving shaft but in driving connection with the driven shaft, planet pinions carried thereby, an internally toothed annulus revolubly mounted on the driven shaft, and a friction brake for holding said annulus stationary, of a second train comprising an internally toothed annulus mounted in driving connection with the driving shaft, disks one of which is revolubly mounted on the driving shaft and is in driving connection with one of the disks of the primary train, planet pinions carried thereby, a sun wheel revolubly mounted in relation to the driving shaft, a drum in driving connection with said sun wheel, and a friction brake for holding said drum stationary, of a third train comprising a sun wheel mounted in driving connection with the annulus of the second train, disks revolubly mounted in relation to the driving shaft, planet pinions carried thereby, a drum carried by one of said disks, a friction brake for holding said drum stationary, and an internally toothed annulus mounted in driving connection with one of the disks of the second train, and of a sliding clutch for coupling the sun wheel of the secondary train to one of the disks carrying the planet pinions of same train.

In testimony whereof I affix my signature in the presence of two witnesses.

FREDERICK HENRY ROYCE.

Witnesses:
C. POPPLETON,
M. OLLEY.